United States Patent [19]

Vaught

[11] Patent Number: 5,775,488

[45] Date of Patent: Jul. 7, 1998

[54] THERMOMETER HOLDER AND ADJUSTMENT TOOL

[75] Inventor: Earl D. Vaught, Asheville, N.C.

[73] Assignee: Taylor Environmental Instruments, L.P., Northfield, Ill.

[21] Appl. No.: 710,002

[22] Filed: Sep. 11, 1996

[51] Int. Cl.[6] .............................. B65D 85/38; G01K 15/00
[52] U.S. Cl. .......................... 206/306; 206/37; 206/569; 374/1; 374/208
[58] Field of Search .............................. 206/306, 305, 206/37, 38, 234, 569; 374/208, 209, 158, 1, 207

[56] References Cited

U.S. PATENT DOCUMENTS

| | | | |
|---|---|---|---|
| 1,919,811 | 7/1933 | Stonebraker | 206/306 |
| 1,947,175 | 2/1934 | Schneider | 206/306 |
| 2,037,201 | 4/1936 | Rowntree | 206/306 |
| 2,586,448 | 2/1952 | Weber et al. | 206/306 |
| 3,151,739 | 10/1964 | Guffy | 206/306 |
| 3,283,894 | 11/1966 | Hafner et al. | 206/306 |
| 4,572,366 | 2/1986 | Carson | 206/306 |
| 4,595,301 | 6/1986 | Taylor | 374/208 |
| 4,950,085 | 8/1990 | Horvath | 374/207 |
| 5,678,923 | 10/1997 | Germanow et al. | 374/1 |

FOREIGN PATENT DOCUMENTS 0639770  1/1979  U.S.S.R. .................. 206/306

*Primary Examiner*—Paul T. Sewell
*Assistant Examiner*—Luan K. Bui
*Attorney, Agent, or Firm*—McDermott, Will & Emery

[57] ABSTRACT

A pocket tube device (10) provides a support for retaining and protecting a probe-type thermometer (30) and a device for adjustment or calibration thereof. The device includes a central bore (14) adapted to closely receive and protect a tube or probe (52) of the thermometer, and abuts at one end the transverse indicator case (32) of the thermometer. The device preferably includes an external shirt-pocket clip (20) at one end and a cross-bore (26) at the other end adapted to receive the probe of the thermometer when the latter is placed therein for adjustment purposes. Wrench flats (60) extend adjacent the cross-bore and form an external socket on the device for receivable engagement with an adjustment member (58) on the underside of the indicator case. The pocket tube device serves to provide a leveraged adjustment between relatively rotatable portions of the thermometer case and thus between a pointer indicator (84) and indicia on a dial plate (48). Grippers are provided in the central bore and cross-bore for releasably retaining the thermometer probe in each of the bores when positioned therein.

9 Claims, 2 Drawing Sheets

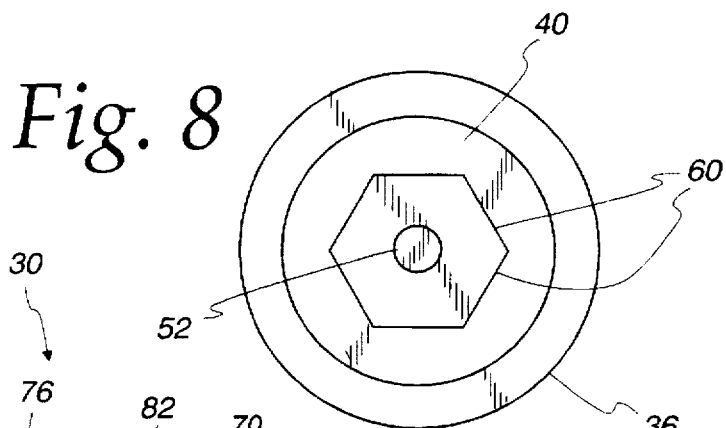
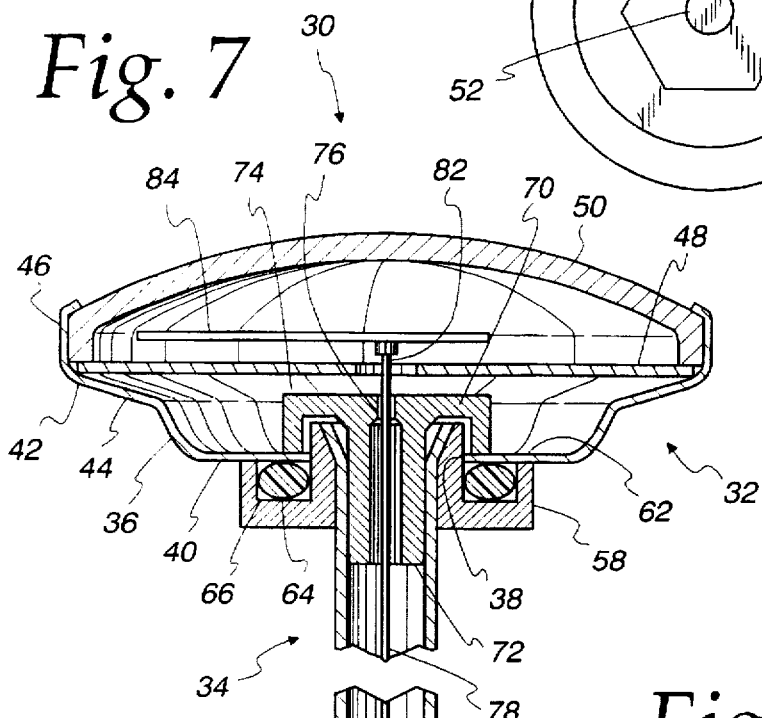
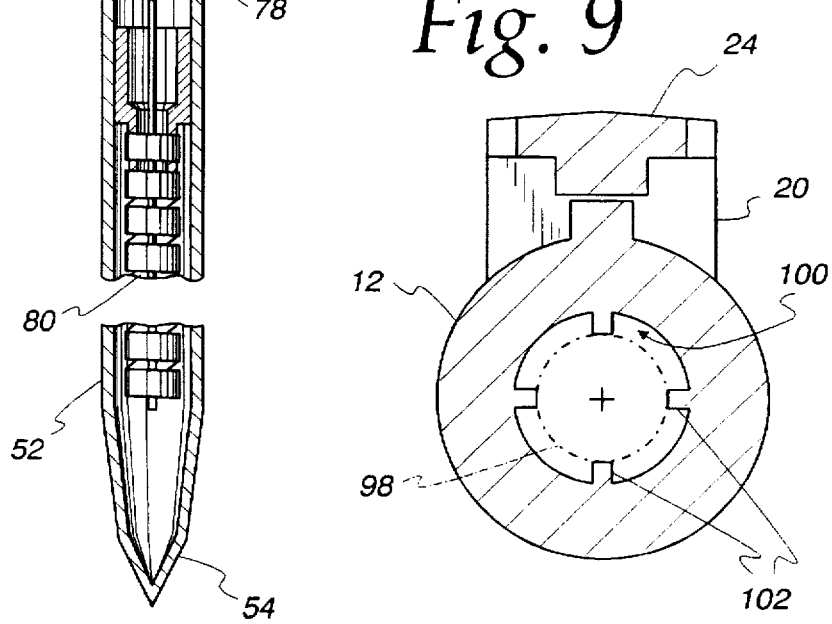

THERMOMETER HOLDER AND ADJUSTMENT TOOL

TECHNICAL FIELD

This invention relates to temperature sensing instruments, and more particularly to a pocket holder and adjustment device for probe-type thermometers.

BACKGROUND ART

One popular form of probe-type thermometer consists of a metal tube containing a bimetal spring adapted for placement in any environment in which temperature sensing is desired. A transverse dial case mounted at one end of the tube contains a scale for relatively remote indication of the temperature being sensed. A pointer indicator in connection with the bimetal spring provides the indication of temperature sensed by movement relative to the scale.

For ease of calibration of this type of thermometer a slip-joint is included in the assembly. The relative positions of the indicator and the scale can be changed by relative rotation between the probe component and the dial case. Spring-biased frictional engagement secures the thermometer assembly in its adjusted position. Because the slip-joint is relatively tight to prevent the entrance of contaminants and the size of the dial case is relatively small for portability and convenience, it is difficult for the technician to affect calibration of the instrument in the field without having access to suitable tools for the purpose of adjustment.

DISCLOSURE OF INVENTION

It is an object of the present invention to provide a combined, portable holder and adjustment tool device for an indicating apparatus, such as for probe-type thermometers.

It is a further object of the present invention to provide a pocket holder and adjustment tool device for probe-type thermometers which is comfortably sized for convenient carrying in a shirt pocket or the like and includes a pocket clip for the purpose.

It is a further object of the present invention to provide a tubular pocket holder and adjustment tool device for probe-type thermometers which includes a socket at one end thereof for engagement with a relatively movable part of the thermometer assembly to provide a leveraged adjustment device.

It is a further object of the present invention to provide a pocket holder and adjustment tool device for probe-type thermometers which includes gripper devices in the central bore of the tubular member and a cross-bore adjacent the socket for releasably retaining the probe of the thermometer in stored and adjustment positions, respectively.

It is a further object of the present invention to provide a method for storing and adjusting a probe-type indicating apparatus such as a probe-type thermometer with a combined portable holder and adjusting tool device.

Further objects of the present invention will be made apparent in the following Best Modes for Carrying Out Invention and appended claims.

The foregoing objects are accomplished in the preferred embodiment of the invention by a pocket holder and adjustment tool device consisting of a body or member having a central bore therein, a pocket clip at one end, a cross-bore at the other end, a socket on the periphery of the body surrounding the cross-bore, and separate gripper devices in each bore for releasably retaining the probe of a probe and dial type thermometer.

The device is of sufficient length to completely enclose and protect the probe of the thermometer when in the stored position in the central bore. The socket is at one end of the device to provide maximum leverage for adjustment of relatively rotatable portions of the thermometer assembly. The socket consists of a pair of confronting, vee-shaped, transverse flanges axially spaced on the periphery of the device about the cross-bore.

The gripper device in the cross-bore is a small offset of the parallel axes of a pair of bores at opposite sides of the device to provide slight frictional engagement with the probe of a transversely inserted thermometer. This enables holding the probe of the thermometer during adjustment as well as during the taking of measurements.

The gripper device in the central bore consists of four equally spaced, generally radially inwardly directed, axially extending thin web projections, sized to provide an interference fit with the probe of a thermometer positioned in the central bore. The projections may be radially directed or canted at a slight angle from radial to facilitate deflection thereof. The projections provide a resilient grip upon the inserted probe of a thermometer.

BRIEF DESCRIPTION OF DRAWINGS

FIG. 7 is a side, cross sectional view of a thermometer assembly used in conjunction with the device of the invention.

FIG. 8 is an end view of the thermometer assembly depicted in FIG. 7.

FIG. 9 is across sectional view similar to FIG. 5 of an alternative embodiment of the device.

BEST MODES FOR CARRYING OUT INVENTION

Figure 1:
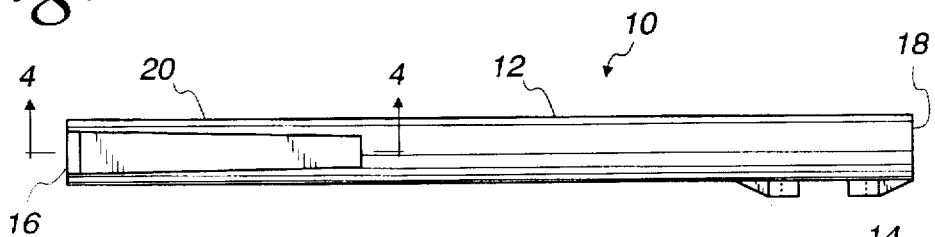
FIG. 1 is a plan view of the preferred embodiment of the device of the present invention.
Figure 2:
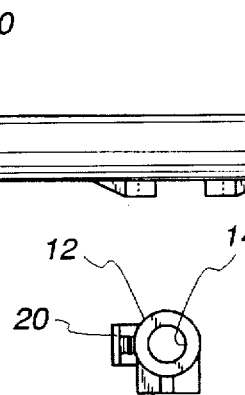
FIG. 2 is an end view of the device of FIG. 1.
Figure 3:
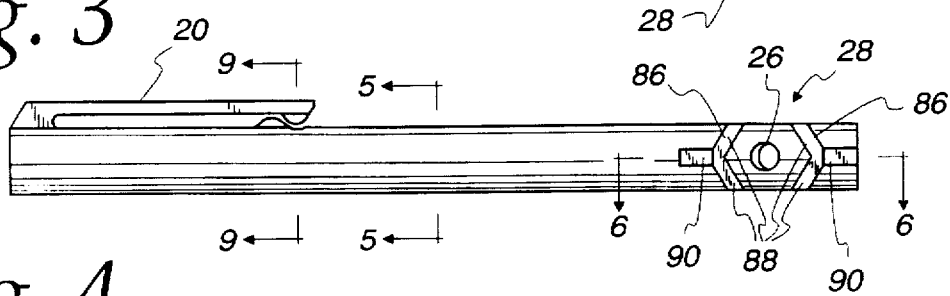
FIG. 3 is a side view of the device of FIG. 1.
Figure 4:
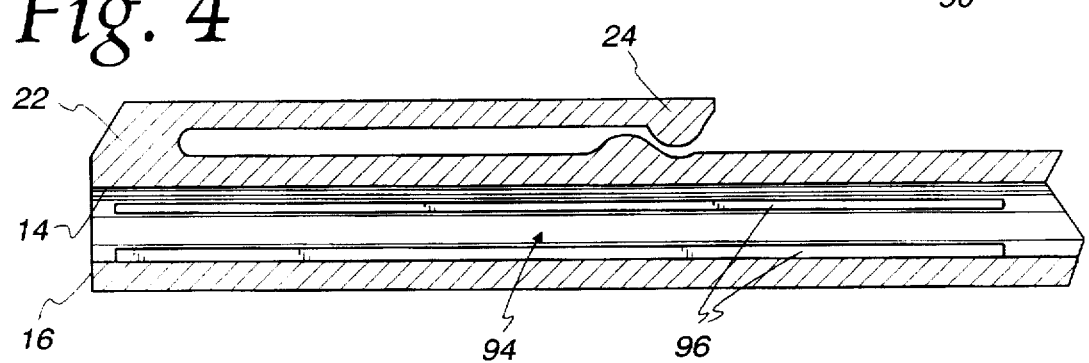
FIG. 4 is an enlarged, side, cross sectional view of a portion of the device of FIG. 1, taken along the lines 4—4.

Referring now to the drawings and initially to FIGS. 1–6, there is shown the preferred embodiment of the pocket tube device 10 of the invention. Pocket tube device 10 consists of cylindrical body member 12 of extended length having a central bore 14 extending throughout the length thereof and terminating in transverse end faces 16, 18. Pocket tube device 10 is preferably an integral molded structure formed of rigid thermoplastic material, such as, for example ABS.

Pocket tube device 10 includes an axially extending clip 20 at one end thereof adjacent end face 16. Clip 20 includes a base 22 integral with body member 12 and a free end 24. Clip 20 is adapted for resilient interengagement with a shirt pocket or the like of a user, and allows the pocket tube device 10 to be supported in a conveniently available location.

Pocket tube device 10 further includes cross-bore 26 and socket 28 at the other end of body member 12, adjacent end face 18. Socket 28 and cross-bore 26 serve as a device for adjustment and/or calibration of a slim stem bimetal thermometer.

Referring now to FIGS. 7 and 8, there is shown in cross sectional and end views, a thermometer assembly 30 of a type useful in conjunction with the teachings of this invention.

Thermometer 30 comprises generally dial case assembly 32 and probe assembly 34 which, as will be described in greater detail hereinafter, are slidably joined to one another to provide a mechanism for adjustment or calibration of thermometer 30. Dial case assembly 32 comprises a unitary annular outer case wall 36, having a central opening 38. Dial case assembly 32 further includes an inner annular flat section 40, an outer annular section 42, a transition section 44 between sections 40, 42, and an outermost flange 46.

Dial case assembly 32 further comprises an annular dial plate 48 and a domed transparent circular cover 50. The outer portion of dial plate 48 and the outer portion of cover 50 are secured to one another, as well as to outer case wall 36, between outer section 42 and inturned flange 46. This enables dial case assembly 32 to be a rigid assembly. Dial plate 48 preferably includes indicia arranged in a circular configuration on its upper surface which can be viewed through cover 50.

Probe assembly 34 consists of an extended probe or tube 52 having a closed and pointed lower end 54. Tube 52 includes an upper end closely received in a central opening in an adjustment member 58 and fixed thereto as by welding or other attachment method. Adjustment member 58 is preferably a hexagonal solid member, having peripheral flats 60. In the preferred embodiment the flats 60 are paired parallel flat surfaces, extending transverse to the axis of tube 52, as well as to the central opening which receives probe tube 52.

Probe assembly further includes a bushing 70 which performs the functions of interconnecting dial case 32 and probe assembly 34. Bushing 70 includes a lower cylindrical sleeve 72, an upper annular transverse flange 74 and an upper intermediate journal section 76. Cylindrical sleeve 72 is preferably secured in a press fit in a bore of probe or tube 52 and is positioned so that the upper flat surface of flange 74 underlies dial plate 48.

Inner flat section 40 of dial case wall 36 lies adjacent to an upper flat surface 62 of adjustment member 58 and is in relatively tight movable engagement therewith. A resilient O-ring 64 is positioned in an annular recess 66 in adjustment member 58. O-ring 64 engages annular flat section 40. This construction provides a relatively tight friction engagement between dial case assembly 32 and probe assembly 34, but allows relative rotational movement therebetween when oppositely directed torques are exerted thereupon.

Probe assembly 34 further comprises central shaft 78 rotatably mounted in the lower end 54 of tube 52. Central shaft 78 is surrounded by a thermal, bimetal, expansion spring 80 which serves to change a rotational position of the upper end of shaft 78 in response to a change in temperature of the probe. The upper end 82 of shaft 78 extends through journal section 76 of bushing 70 and a central opening in dial plate 48, and is rotatably movable therein. Upper end 82 has a transversely extending pointer indicator 84 affixed thereto. Indicator 84 overlies dial plate 48 and the indicia thereon to provide an indication of the temperature to which probe tube 52 is exposed. It will be apparent that relative rotation between dial case assembly 32 and probe assembly 34 will provide a change in the relative positions of indicator 84 and dial plate 48, and thus achieve an adjustment of the temperature indicated for a given temperature condition to which the probe is exposed.

Referring again to the views of pocket tube device 10 shown in FIGS. 1–6, it will be seen that the socket 28 includes of a pair of confronting vee-shaped projections 86 at the end of body member 12 adjacent end face 18. Each projection 86 includes a pair of flat walls 88 which are substantially parallel to the axis of cross-bore 26 and equally spaced therefrom. Projections 86 are preferably integral with body member 12 and each includes an angled web 90 substantially in-line with the axis of body member 12 to provide additional strength. The socket 28 is preferably disposed on the body member of the device about 90° from the clip 20. This facilitates insertion and removal of the device in a pocket or a user.

Walls 88 are spaced to form the socket 28 which is suitably sized for sliding receipt of adjustment member 58 of thermometer assembly 30. To engage the adjustment member 58 in the socket 28, the probe tube 52 is inserted into the cross-bore 26. The socket 28 serves as a wrench means for affecting relative movement of the indicator 84 to achieve adjustment or calibration. It will be apparent then that adjustment of the temperature indicated by thermometer 30 can be achieved by manually gripping dial case assembly 32 in one hand and pocket tube device 10 in the other, and affecting relative rotational movement until the desired relationship between the position of indicator 84 and the indicia on dial plate 48 is obtained. This is preferably done with the probe exposed to a substance having a known temperature such as boiling water. As a result the indicator may be set at the proper temperature and the thermometer thereby calibrated.

Figure 6:
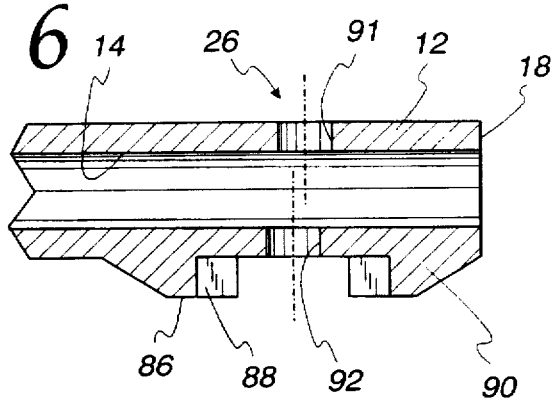
FIG. 6 is an enlarged cross sectional view of the device, taken along the lines 6—6 of FIG. 3.

As is shown most clearly in the enlarged view of FIG. 6, the cross-bore 26 is in fact preferably a pair of bores 91, 92, generally diametrically opposite, but slightly axially offset from one another. Each bore 91, 92 is sized slightly larger than the diameter of probe tube 52 to easily receive tube 52, but offset sufficiently to provide frictional engagement with tube 52 when adjustment member 58 is nested in socket 28. Cross-bore 26 thus provides a frictional gripping device for engagement with probe tube 52 to help retain thermometer 30 together with pocket tube device 10 during an adjustment procedure.

A further advantage of the preferred embodiment of the invention is that the cross-bore 26 provides a means for holding the thermometer 30 in engagement with the pocket tube device as the tube or probe is extended into a substance whose temperature is to be determined. This enables a user to hold the thermometer by the pocket tube device 10 which reduces the risk of the user contacting the substance. The fact that the pocket tube device is preferably comprised of material that has low thermal and electrical conductivity further reduces the risk of harm to a user who holds a thermometer in this manner.

Figure 5:
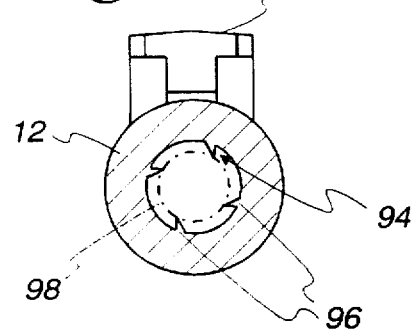
FIG. 5 is an enlarged cross sectional view of the device, taken along the lines 5—5 of FIG. 3.

In a first embodiment shown in FIG. 5, a further gripping device 94 is provided in central bore 14 of body member 12 adjacent end face 16 thereof. Gripping device 94 in this embodiment consists of four generally radially, inwardly projecting thin webs 96, which are equally circumferentially spaced, and which extend approximately one-half the length of body member 12. Each web 96 is generally triangular in cross section and is canted at a slight angle from a direct radial position to provide a resilient structure for gripping engagement with the probe tube 52 of thermometer 30 when inserted therein. Webs 96 are sized so that the tips thereof freely lie in a circle 98 slightly smaller than the diameter of probe tube 52. Gripping device 94 tends to hold the tube or probe of the thermometer in the central bore 14 so it does not readily fall out when a user bends over or runs while carrying the device.

An alternative embodiment with a gripping device generally indicated 100 is shown in FIG. 9. In this alternative embodiment radially extending webs 102 are provided in place of webs 96. Webs 102 are sufficiently resilient to hold probe 52 in the central bore in engaged relation therewith. Of course the probe can be readily removed from the bore when required.

Thus, the apparatus of the present invention achieves the above-stated objectives, eliminates difficulties encountered in the use of prior devices, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations given herein are by way of examples and the invention is not limited to the exact details shown and described. Further, in the following claims, any feature of the invention which is described as a means for performing a function shall be construed as encompassing any means capable of performing the recited function, and shall not limited to the particular means shown herein or mere equivalents.

Having described the features, discoveries and principles of the invention, the manner in which it is constructed, operated and utilized, and the advantages and useful results attained; the new and useful structures, devices, elements, arrangements, parts, combinations, systems, equipment, operations, methods and relationships are set forth in the appended claims.

I claim:

1. A device for adjusting a probe-type thermometer which has a probe portion, an adjustment member and a dial portion which is movable relative to the probe portion and the adjustment member in order to adjust the thermometer said device comprising:

a cylindrical member having an exterior surface and an interior surface, said interior surface being defined by a generally longitudinal bore in said cylindrical member, said bore being sized for accepting the probe portion of the thermometer, whereby the thermometer may be stored within said cylindrical member, said cylindrical member also having a transverse opening therein, said transverse opening also being sized for accepting the probe portion of the thermometer, and adjustment member receiving means, adjacent said transverse opening, for receiving the adjustment member of the thermometer and for preventing rotational movement of the adjustment member relative to said cylindrical member whereby a user can easily adjust the thermometer by rotating the dial portion of the thermometer relative to said cylindrical member.

2. A device as set forth in claim 1 wherein said transverse opening includes a cross-bore adjacent one end of said cylindrical member and said adjustment member receiving means includes at least two walls adjacent said cross-bore.

3. A device as set forth in claim 2 wherein said walls are disposed generally perpendicular to a longitudinal axis of said cylindrical member.

4. A device as set forth in claim 3 wherein said walls include two pairs of walls axially spaced on the periphery of said cylindrical member, each of said pair of walls being arranged to form a substantially vee-shaped configuration.

5. A device as set forth in claim 1 further comprising first gripping means for releasably gripping the probe portion of the thermometer when the probe portion of the thermometer is positioned in said transverse opening of said cylindrical member.

6. A device as set forth in claim 5 wherein said first gripping means comprises offset surfaces of said cylindrical member forming said transverse opening, spaced to provide a slidable interference fit for the probe portion of the thermometer.

7. A device as set forth in claim 5 further comprising second gripping means for releasably gripping the probe portion of the thermometer when the probe portion of the thermometer is positioned in the generally longitudinal bore of said cylindrical member.

8. A device as set forth in claim 7 wherein said second gripping means comprises axially-extended, radially inwardly directed projections supported on said interior surface of said cylindrical member, said projections adapted to resiliently engage the probe portion of the thermometer and provide an interference fit therewith.

9. A device as set forth in claim 7 further comprising a pocket clip disposed on said exterior surface of said cylindrical member, whereby said clip is enabled to releasably hold said cylindrical member in a shirt pocket of a user.

* * * * *